No. 667,669. S. H. BLOWERS. Patented Feb. 12, 1901.
PILE DRIVER.
(Application filed July 19, 1899.)
(No Model.) 11 Sheets—Sheet 3.
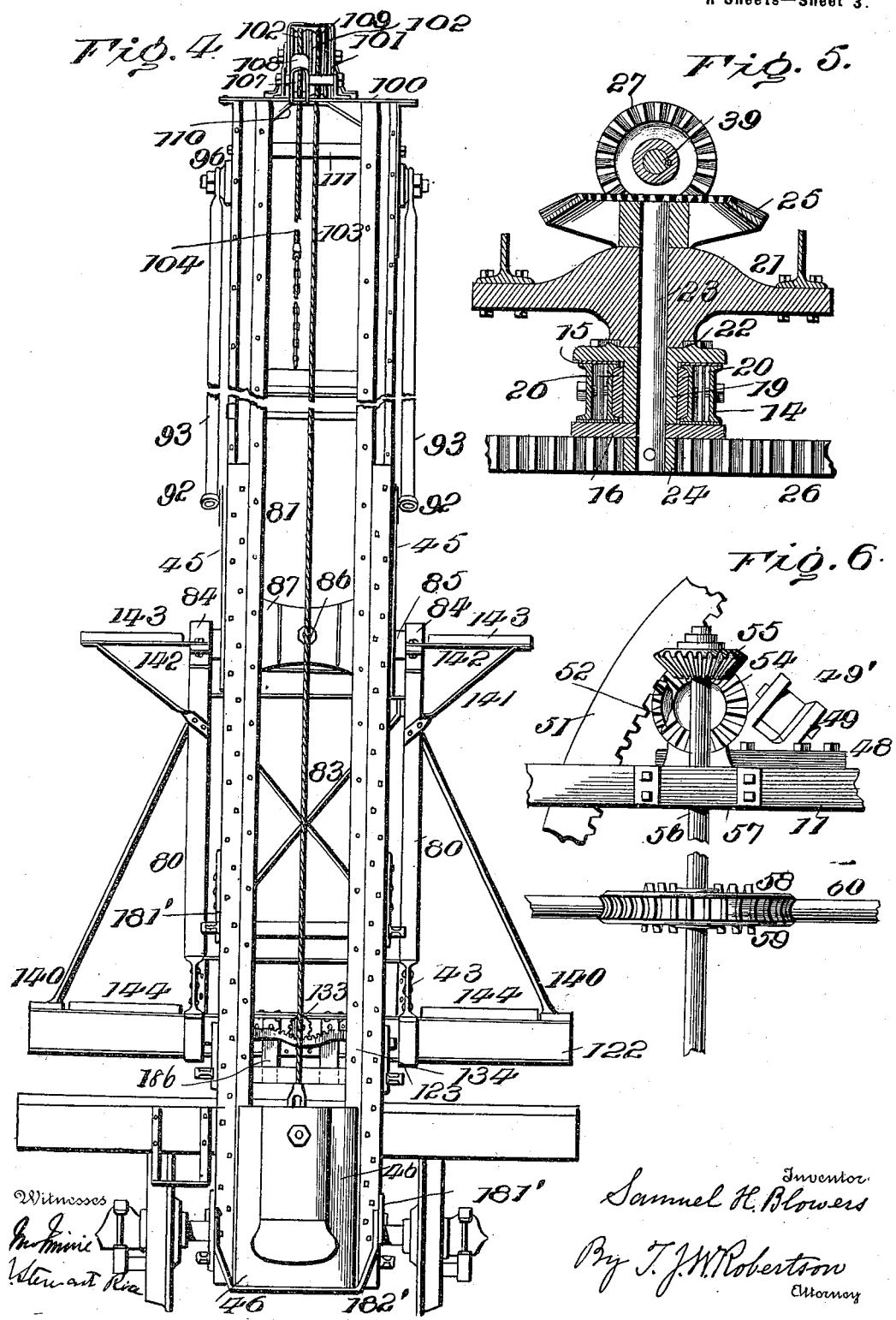

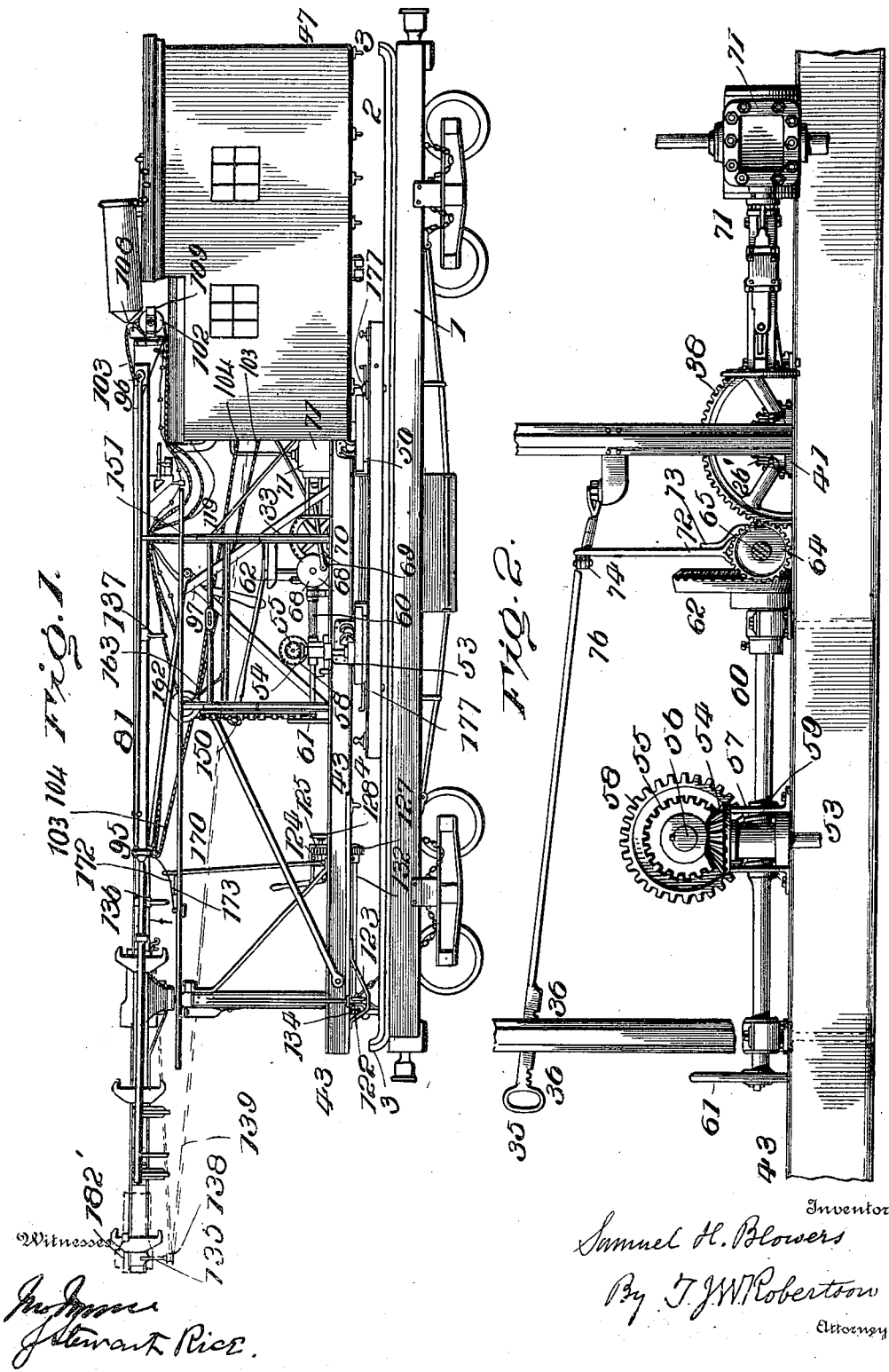

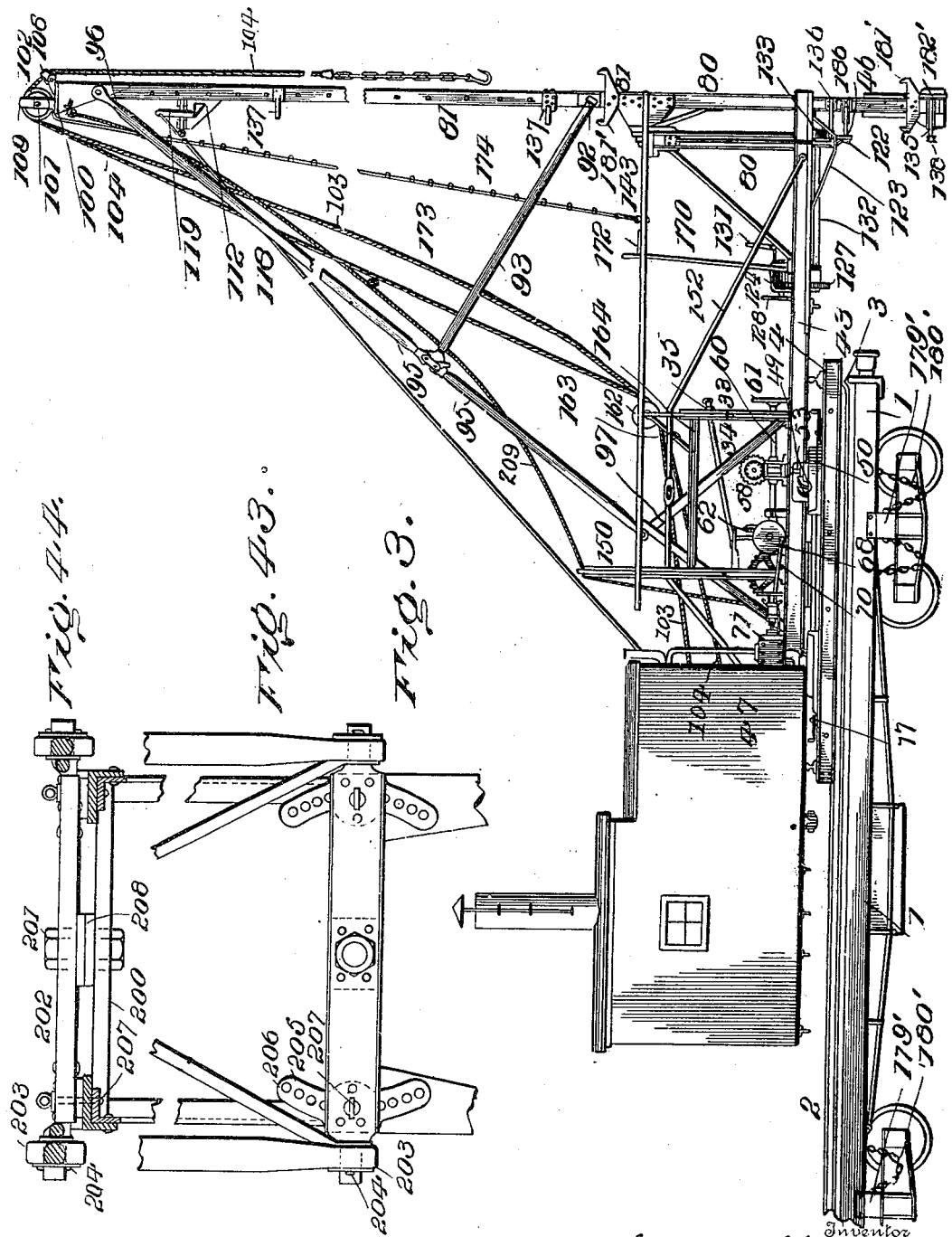

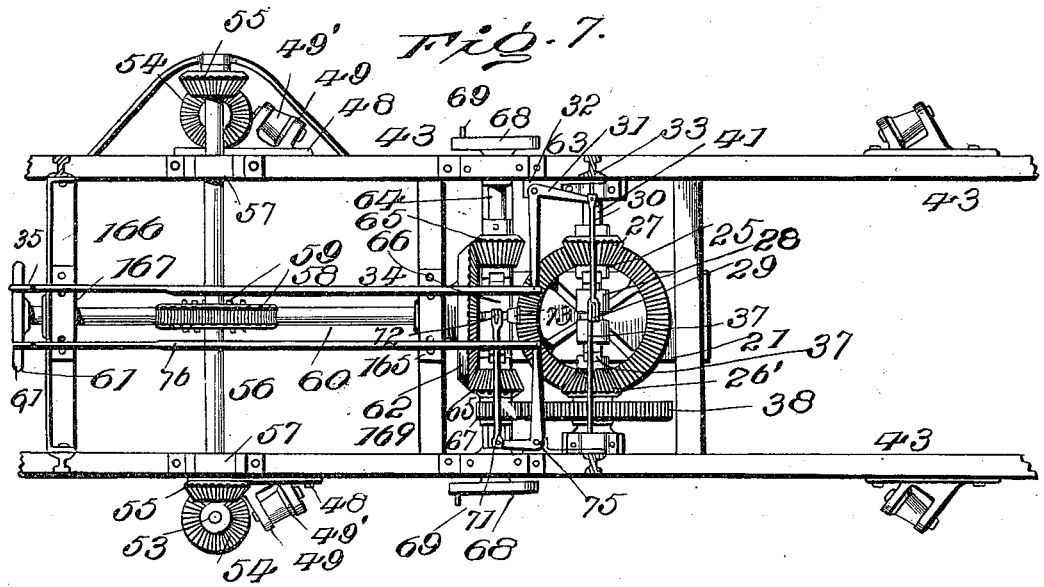
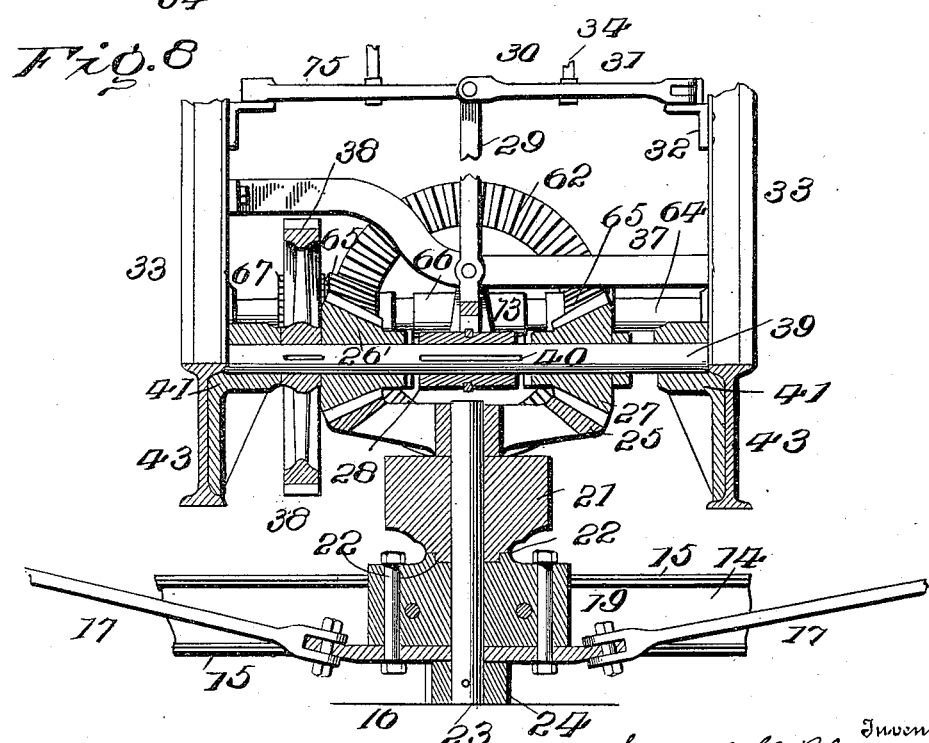

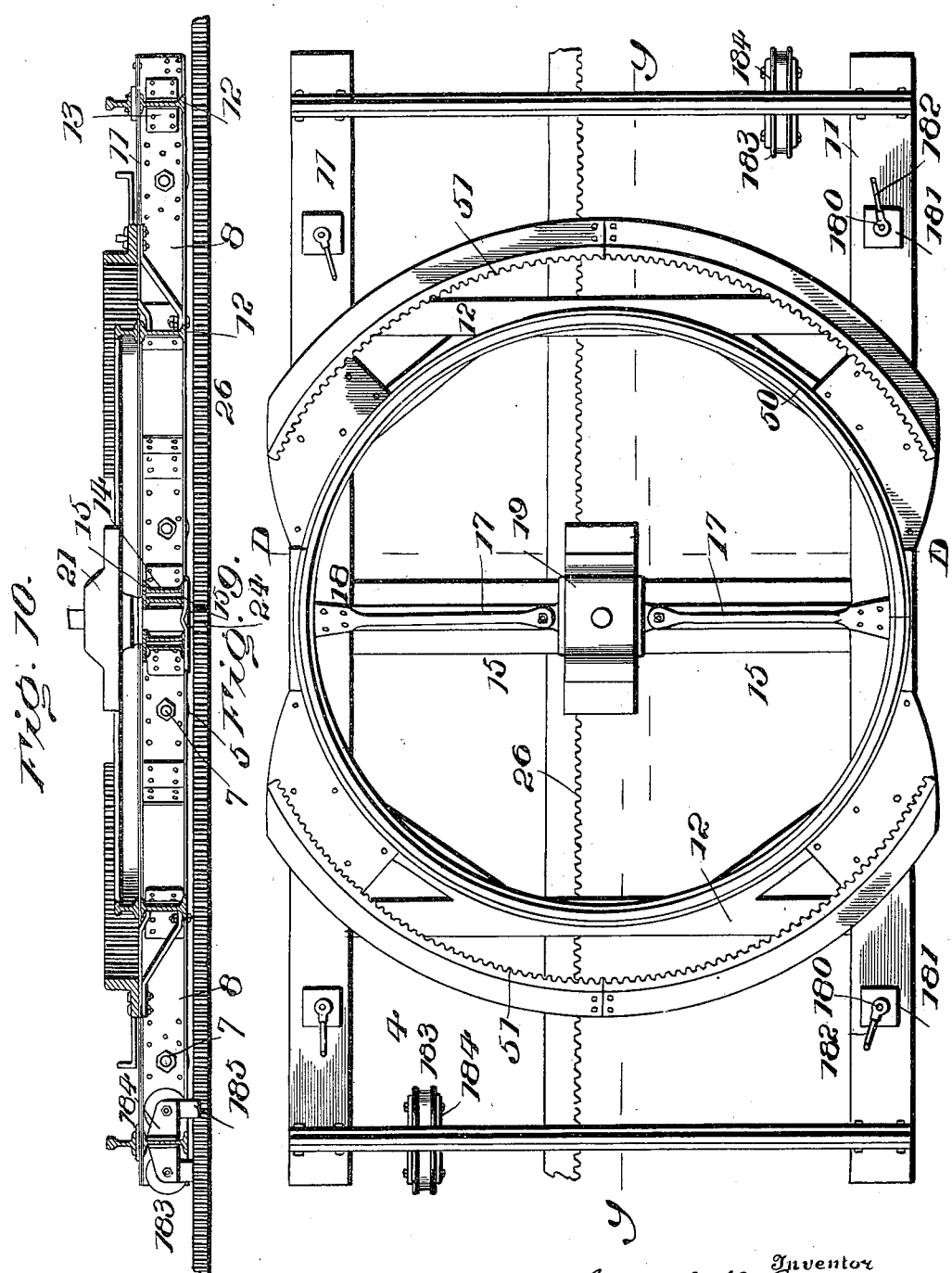

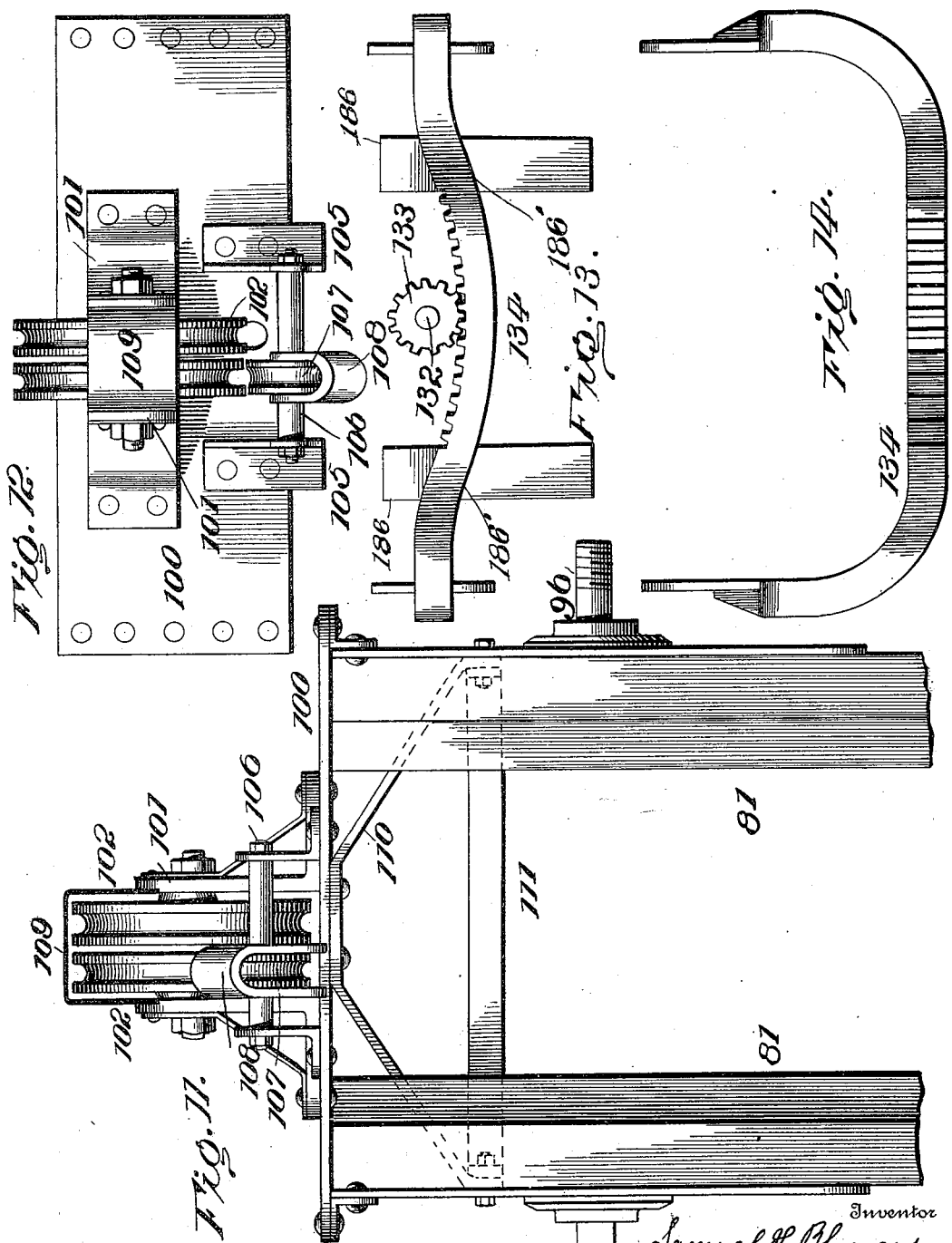

No. 667,669. Patented Feb. 12, 1901.
S. H. BLOWERS.
PILE DRIVER.
(Application filed July 19, 1899.)
(No Model.) 11 Sheets—Sheet 7.
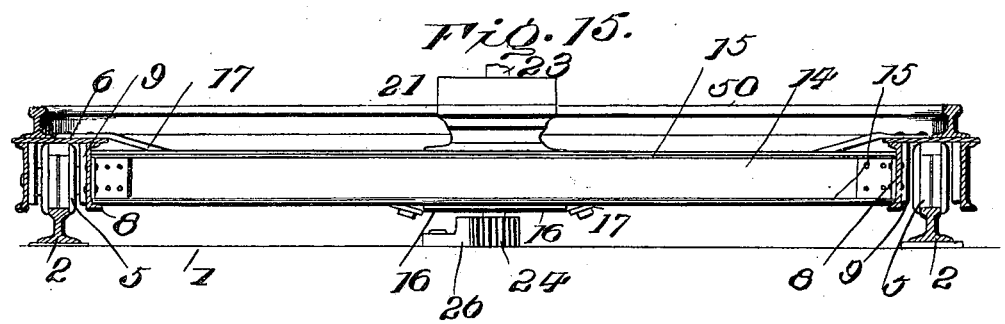
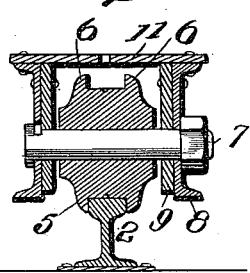
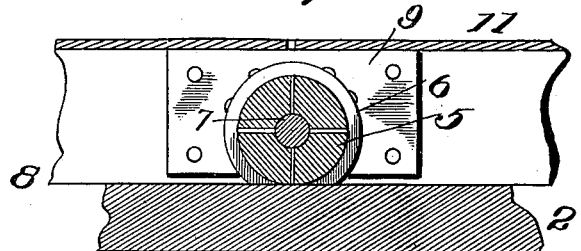
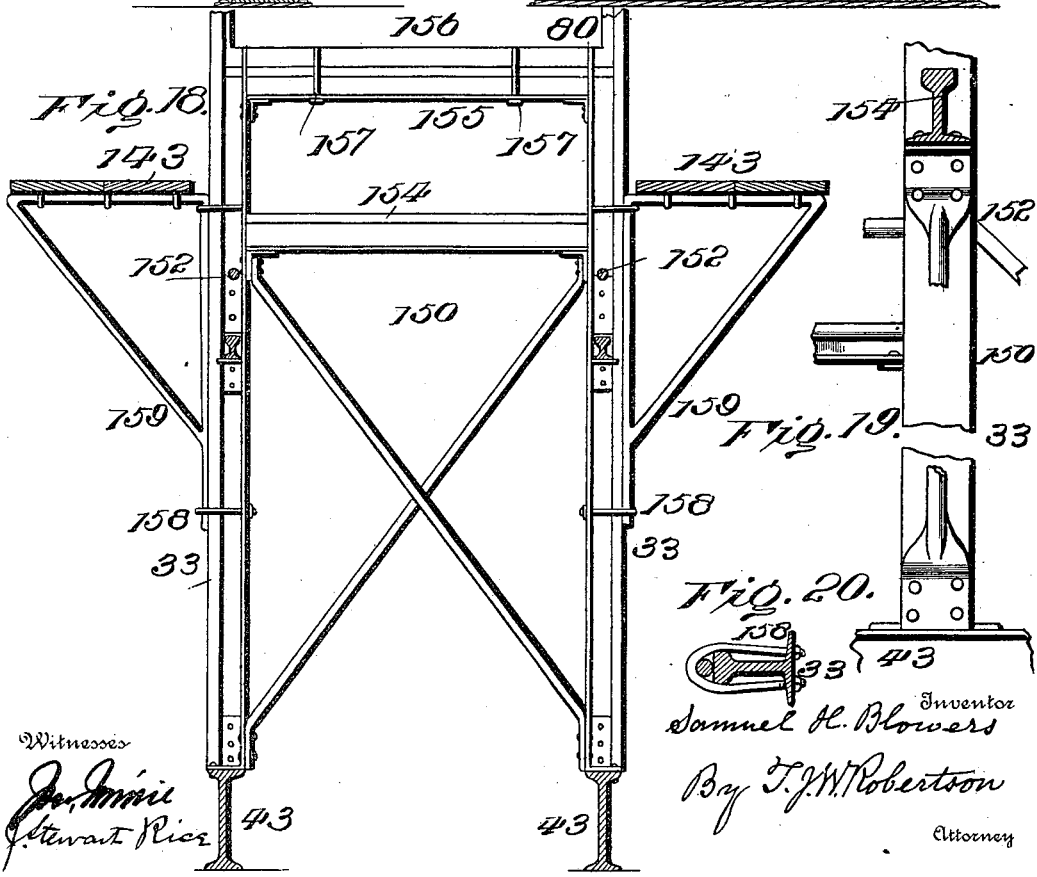
Witnesses
Inventor
Samuel H. Blowers
By T. J. W. Robertson
Attorney No. 667,669. Patented Feb. 12, 1901.
S. H. BLOWERS.
PILE DRIVER.
(Application filed July 19, 1899.)
(No Model.) 11 Sheets—Sheet 8.
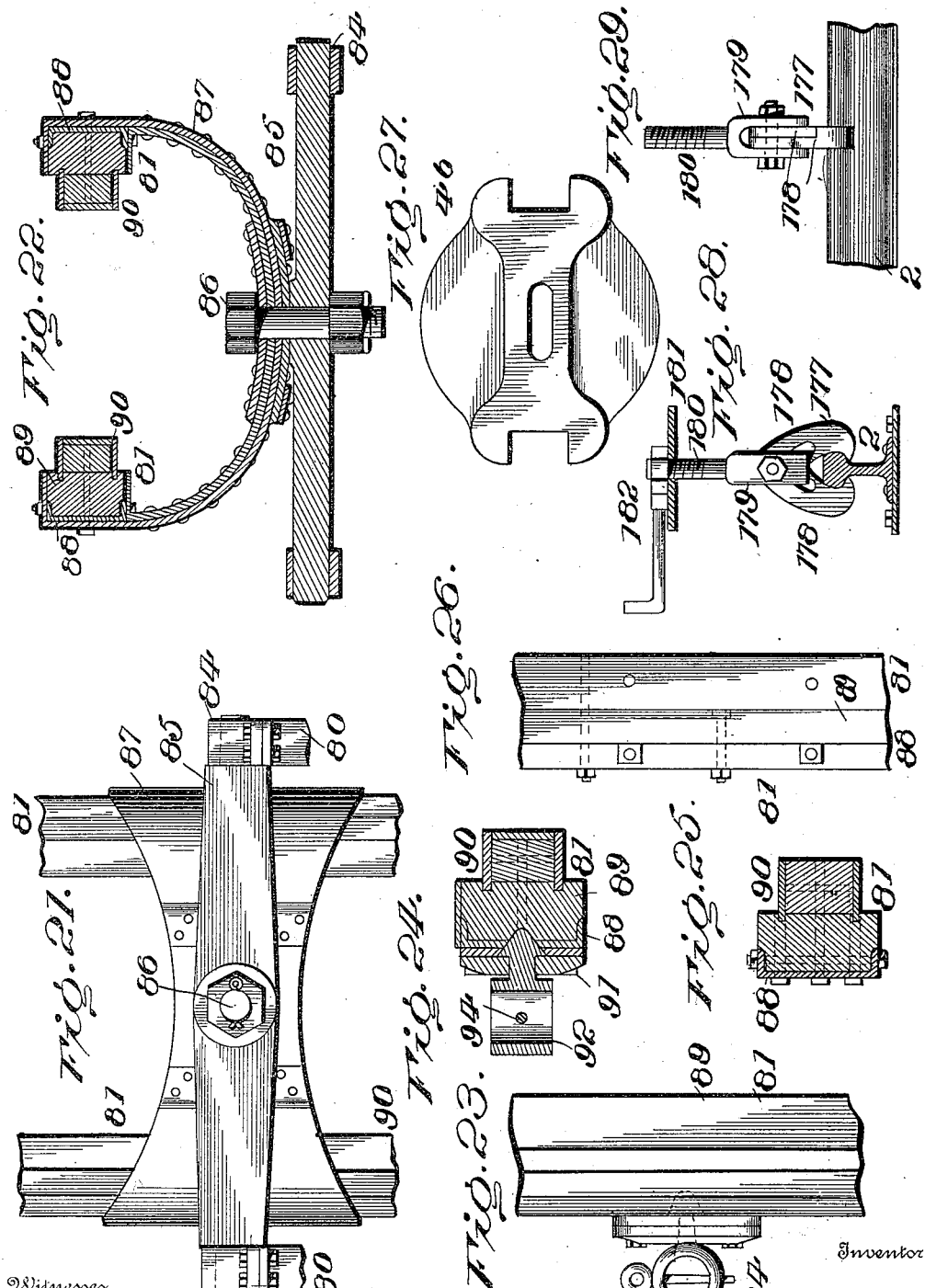
Witnesses
Inventor
Samuel H. Blowers
By T. J. W. Robertson, Attorney

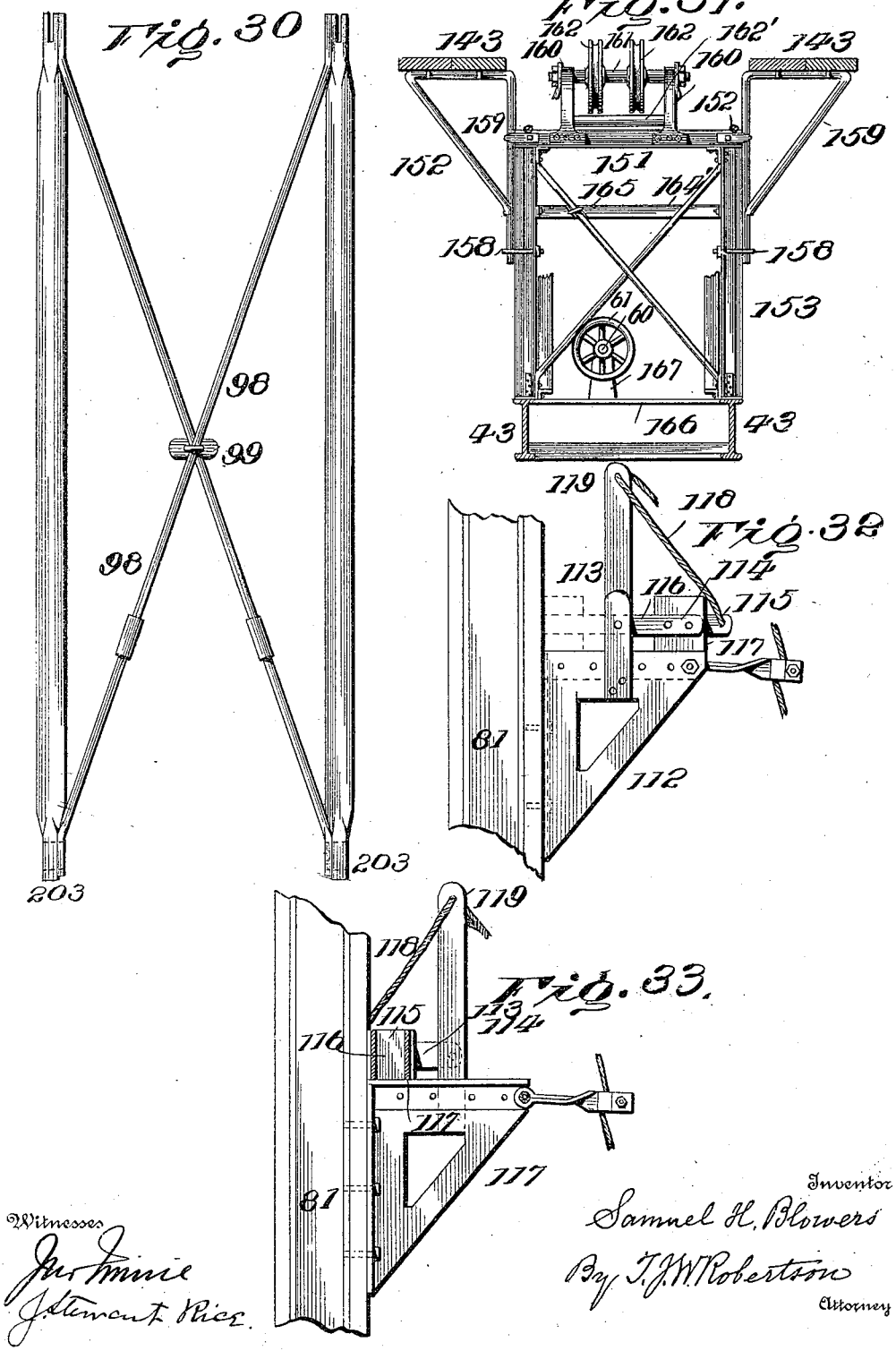

No. 667,669. Patented Feb. 12, 1901.
S. H. BLOWERS.
PILE DRIVER.
(Application filed July 19, 1899.)
(No Model.) 11 Sheets—Sheet 10.

Witnesses
Inventor
Samuel H. Blowers
By T. J. W. Robertson
Attorney

No. 667,669. Patented Feb. 12, 1901.
S. H. BLOWERS.
PILE DRIVER.
(Application filed July 19, 1899.)
(No Model.) 11 Sheets—Sheet 11.
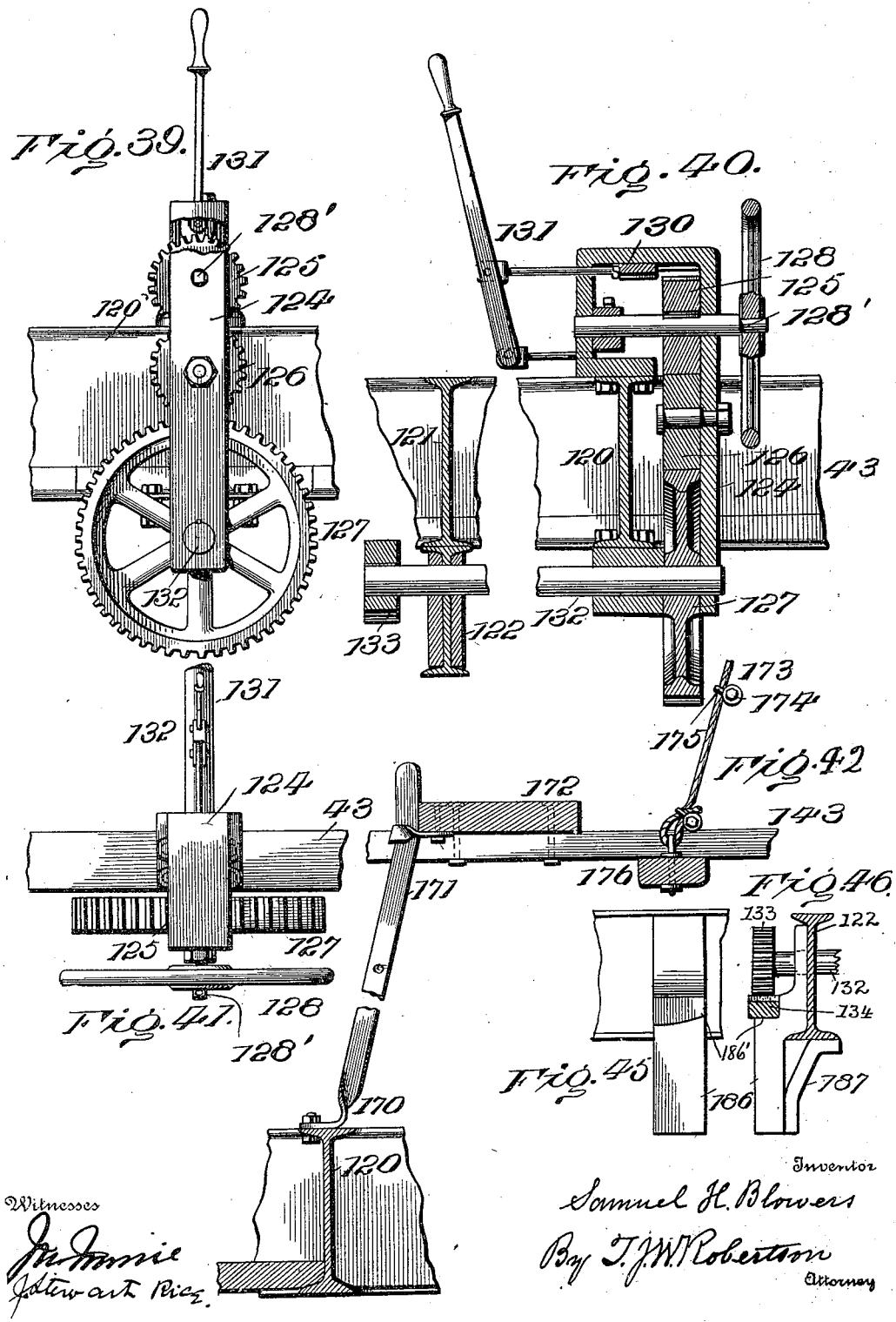
Witnesses
Inventor
Samuel H. Blowers
By T. J. W. Robertson
Attorney

UNITED STATES PATENT OFFICE.

SAMUEL H. BLOWERS, OF ZANESVILLE, OHIO.

PILE-DRIVER.

SPECIFICATION forming part of Letters Patent No. 667,669, dated February 12, 1901.

Application filed July 19, 1899. Serial No. 724,399. (No model.)

*To all whom it may concern:*

Be it known that I, SAMUEL H. BLOWERS, a citizen of the United States, residing at Zanesville, in the county of Muskingum and State of Ohio, have invented a certain new and useful Improvement in Pile-Drivers, of which the following is a specification, reference being had to the accompanying drawings.

This improvement relates to that class of pile-drivers that are mounted on cars and intended to be used on railroads; and the object of the invention is to provide a pile-driver of this character that can be readily taken to the place where it is to be used, quickly set up for work, easily and conveniently operated when in use, and rapidly folded down for transportation after its work is done or to move it out of the way of passing trains.

To these ends the invention consists in the peculiar construction, arrangement, and combinations of parts hereinafter more particularly described and then definitely claimed at the end hereof.

Figure 34:
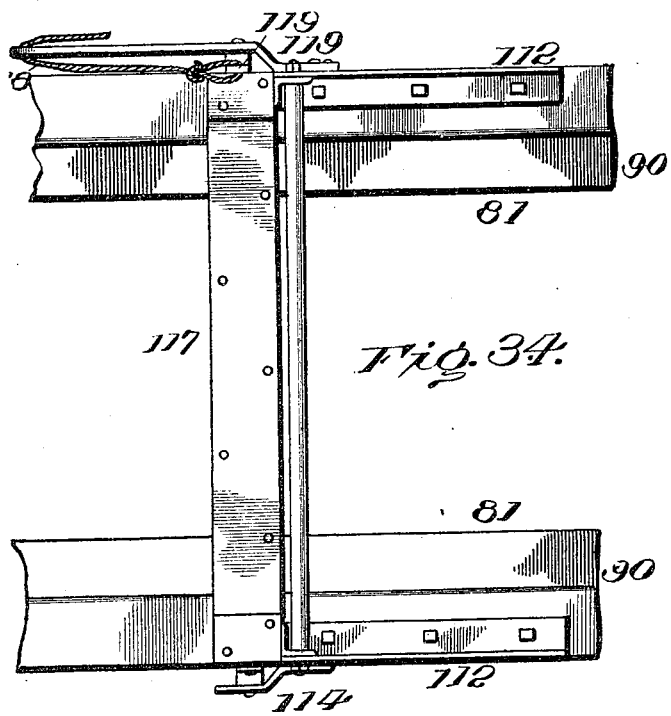
Figure 36:
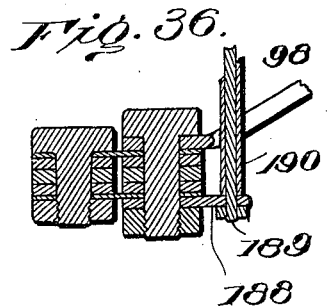
Figure 35:
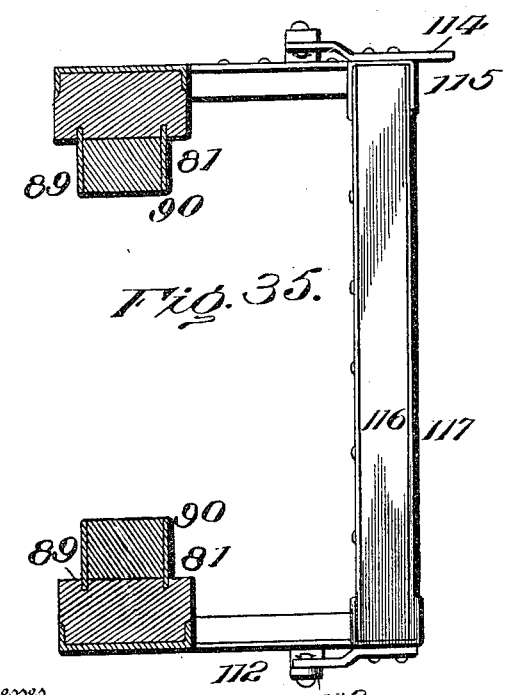
Figures 37, 38:
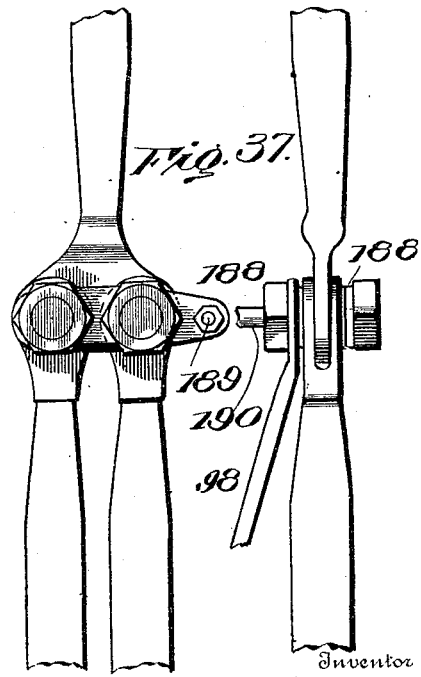

In the accompanying drawings, Figure 1 is an elevation of my pile-driver folded down as for transportation. Fig. 2 is a similar view of some of the gearing for the same, but on a larger scale. Fig. 3 is a similar view of the pile-driver ready for work, but taken from the opposite side from that shown in Fig. 1. Fig. 4 is a front view of the pile-driver. Fig. 5 is a longitudinal vertical section of Fig. 7, but with parts left off. Fig. 6 is a detail of some of the gearing for turning the pile-driver on the carriage. Fig. 7 is a plan of the mechanism for changing the position of the pile-driver. Fig. 8 is a horizontal cross-section taken at right angles to that shown in Fig. 5. Fig 9 is a plan of the carriage, circular track, racks, &c., by the use of which the position of the pile-driver on the car is changed as desired. Fig. 10 is a vertical section through line *y y* on Fig. 9. Fig. 11 is an enlarged front view of the sheaves, &c., on the top of the pile-driver leads. Fig. 12 is a plan of the same. Fig. 13 is a front view of a pinion, the rack-buck on which it operates, and supports for the rack. Fig. 14 is a plan of the same rack-buck shown in Fig. 13. Fig. 15 is a cross-section on the line D D Fig. 9. Figs. 16 and 17 are sectional details of the rollers on the carriage. Fig. 18 is an elevation of a frame to be more fully described hereinafter. Fig. 19 is a detail, on a larger scale, showing the connection of the parts. Fig. 20 is a detail of a clip connecting the brackets shown in Fig. 18 to the frame. Fig. 21 is a rear view of portions of the leads and mechanism by which they are connected to their support. Fig. 22 is a horizontal section through the same. Figs. 23, 24, 25, and 26 are details of the "leads" and connections. Fig. 27 is a plan of the hammer. Fig. 28 is an elevation of clamp used for fastening the carriage in a rigid position on the car. Fig. 29 is another view of part of the same, taken at right angles to that shown in Fig. 28. Fig. 30 is an elevation of part of a guy. Fig. 31 is an elevation of a frame. Figs. 32 and 33 are a side view and a section, respectively, of a trip for holding the hammer in an elevated position. Figs. 34 and 35 are a rear and a plan view, respectively, of the same. Figs. 36, 37, and 38 are details of the joints of a guy, part of which is shown in Fig. 30. Fig. 39 is a rear view of the mechanism for tilting the leads. Fig. 40 is a vertical central section of the same, taken at right angles to Fig. 39. Fig. 41 is a plan of the same. Fig. 42 shows details of the ladders. Fig. 43 is an elevation of a connection of the guy partly shown in Fig. 30. Fig. 44 is a plan of the same. Fig. 45 is a front view of one of a pair of brackets which form guides for a rack and part of an I-beam to which the brackets are attached. Fig. 46 shows a side view of the same bracket with the I-beam in section, the rack for which the bracket forms a guide, (also in section,) a pinion which operates on the rack, and the shaft for the said rack, the last two being in full lines.

Referring now to the details of the drawings by numerals, 1 indicates the platform of the car, mounted on trucks in the usual manner, but carrying two rails 2, running from end to end of the car and having their ends turned up, as shown at 3, to form stops for the carriage 4, whose rollers 5 run on said rails. These rollers have two flanges 6, as shown in the sectional detail in Fig. 16, to insure greater safety. They are mounted on steel axles 7 (see Figs. 16 and 17) set in channel-iron sills 8, running in pairs from end to end of the carriage, which sills are reinforced at the points where the axles run through them by plates 9, firmly riveted thereto. These sills are coupled together by plates 11, securely fastened thereto, and are connected at and near their ends by cross-sills 12, formed of I-beams, which are secured thereto by angle-irons 13, riveted to both longitudinal and cross sills. At the center are set two pairs of channel-iron cross-sills 14, each pair coupled together at top and bottom by plates 15. Beneath the lower plates is set a short thicker plate 16, forming, with the rods 17, a truss 18. These rods are flattened out at one end and bifurcated at the other, the flattened ends being riveted to the plates 11 (see Fig. 9) and the other ends bolted to the plate 16. Bolted to this plate and supported by the truss is a block or center casting 19, (see Fig. 8,) which center casting is also bolted to the central cross-sills, (see Fig. 5,) filling-in pieces 20 being set between the channel-irons and between them and the center casting 19 to make the joint stronger.

Supported by and turning on the center casting 19 is a second center casting 21, the bottom of which sets in a recess 22 in said center casting 19, and through both center castings runs a vertical shaft or keybolt 23, having on its lower end a (preferably) solid steel pinion 24 and on its upper end a bevel-gear 25, both firmly fastened thereto.

The pinion 24 meshes with a rack 26, secured to the car-floor, so that when the pinion is turned the carriage, with the pile-driving devices which it carries, can be moved backward or forward over the car. Motion is given to the pinion in different directions, according to the direction the carriage is to move, by means of the bevel-pinions 26' and 27, either of which may be put into motion by moving the clutch 28, through the medium of the lever 29, (see Fig. 8,) one end of which is connected with the clutch and the other end, by a link 30, with a bell-crank lever 31, mounted on a bracket 32, bolted to a standard 33, rising from the carriage. This bell-crank lever is connected to one end of a rod 34, having at its other end a handle 35 and notches 36, by which it may be moved and secured in any desired position. Running from one standard 33 to the other on the opposite side of the carriage is a bar 37, which supports the lever 29 and which bar is bent upward and then horizontally, as shown in Fig. 8, so as not to interfere with a spur-gear 38, mounted on the shaft 39, carrying the bevel-pinions 26 and 27, which pinions revolve loosely on the shaft and only turn when the clutch engages with them. The spur-gear 38 is keyed fast on the shaft 39, so that when said gear is set in motion the shaft turns with it, and thus turns the clutch, which, although compelled to move with the shaft-spline 40, set in the shaft 39, can be readily moved by the lever 29 to engage with either pinion, and thus turn it, or can be held at an equal distance from each, and thus give no motion to either. As these pinions will turn the gear 25 in opposite directions, it is evident that the carriage can be moved in either direction on the car by moving the clutch into contact with the proper pinion.

The shaft 39 is mounted on brackets 41, secured on long deep I-beams 43, that are securely bolted on the center casting 21, (see Figs. 5 and 7,) on whose ends are carried the leads or guides 45 for the "monkey" or hammer 46 and the cab 47, containing the mechanism (not shown) for operating the monkey, and the central portion carries the mechanism for shifting the carriage on the car and turning the pile-driving mechanism, &c., on the carriage. To each of these I-beams are riveted two castings 48, having ears 49, and set in each casting is a roller 49', which runs on a circular rack 50 on the carriage below. (See Figs. 6, 9, and 10.) Surrounding this track are segments of circular racks 51, into which mesh pinions 52 on vertical shafts 53, whose upper ends carry bevel-gears 54, meshing with similar gears 55 on a horizontal shaft 56, mounted in pillow-blocks 57, set on the I-beams 43. On the center of this shaft is secured a worm-wheel 58, operated by a worm 59 on a shaft 60, having a hand-wheel 61 on one end and a bevel-gear 62 on the other, so that it may be operated either by hand or power, as circumstances may dictate. To provide for operating it by power, I have mounted in pillow-blocks 63 on the I-beams 43 a shaft 64, carrying bevel-pinions 65, clutch 66, a spur-gear 67, and two face-plates 68, each face-plate having a wrist-pin 69 set quartering with respect to the pin on the other face-plate. To each wrist-pin is connected a pitman 70 of a separate engine 71 on each side, which may be of the ordinary or any approved construction, and therefore needs no further description here.

At 72 is shown a lever (see Fig. 2) pivoted to a support 73, rising from a cross-sill below, which lever is connected by a link 74 to one end of an elbow-lever 75, whose other end is connected to a rod 76, similar to rod 34, before described, so that either bevel-pinion may be operatively connected with the shaft 64 in the same manner as the bevel-pinions 26 and 27, and thus the shaft 60 be turned in either direction desired, giving a motion to the pile-driver, so as to move it in a lateral direction on either side of the car or turn it entirely around, so as to drive piling at any point desired.

On posts or standards 80, near the outer extremities of the I-beams 43, are mounted the guides or leads for the hammer or monkey 82. These standards are formed of I-beams secured at the bottom to the I-beams 43 by batten-plates and provided with braces 83, having their upper ends fastened to the standards and their lower ends to the I-beams. On the top of these standards are secured bearings 84, in which is set a rocking cross-bar 85, (see Figs. 21 and 22,) to which is pivoted, by a strong bolt 86, a yoke preferably made of heavy plate-iron riveted together and reinforced by other plates at the center. To this yoke the leads or hammer-guides 81 are firmly secured. These are formed of composite materials, the outsides being of channel-iron 88, (see Figs. 24 and 25,) the interior 89 of wood partly covered with iron plates 90, Fig. 24 showing the plates covering the lower fifteen feet of the leads, while Fig. 25 represents the upper part, and all the parts being firmly bolted together.

At 91 on each side are set plates in which are mounted swivel-rings 92, that receive the lower ends of the braces 93, which are secured there by a pin 94. The upper ends are broadened out to receive the ends of the folding guy 95, whose upper end is connected to the upper ends of the leads at 96 and the lower end to inverted-A-shaped standards 97, secured at their lower ends to the I-beams 43 and to a frame 151, to be hereinafter described. The lower section of the guy is provided with cross-bars 98, firmly tied at the crossing-point by a clip 99. (See Fig. 30.)

The upper ends of the leads are connected by a plate 100, on which are set bearings 101 for the sheaves 102, one of these being for the rope 103, that raises the monkey, and the other for the rope 104 for hoisting the piles when required. For convenience in illustration I have shown line 103 slightly loose in Fig. 3. In front of these are two angle-irons 105, forming a support for the shaft 106, on which is mounted a pulley 107 and a guard 108, both of which are capable of moving laterally on the shaft 106 to accommodate the varying positions the rope 104 assumes in raising a pile. The pulleys 102 also have a guard 109 over them to keep the ropes from getting out of place.

Beneath the plate 100 is a stay 110, whose lower ends are connected to the leads and whose center is riveted to the under side of the plate. Beneath this is cross-bar 111, which helps to strengthen the connection between the leads. Below this is set a trip (see Figs. 32 to 35) for catching and holding the hammer, consisting of a substantially triangular plate 112, which is bolted to the leads, from which plate rise the bars 113, to which the arms 114 of the trip 115 are pivoted. The trip is a wooden block 116, square in cross-section and faced with iron plates 117 on two sides. One of the arms 114 has an extension to the rear, to which one end of a trip-rope 118 is attached, and the other end after passing through the standard 119 runs down to a point where it can be easily handled on the carriage. When the hammer has been raised to its greatest height and the trip is in the position shown in full lines in Fig. 32, a slight pull on the rope 118 will raise the trip to a vertical position, and then as the rope is slackened the momentum of the trip will carry it over the center on which it turns and it will fall into the opposite position, (shown in dotted lines in said Fig. 32 and in full lines in Fig. 33,) where it will be ready to support the hammer when it is desired to prevent the latter from falling. When the trip is in the position shown in Fig. 33 and the hammer has been raised, as before, a slight tug on the rope will carry the trip in the opposite direction to the position shown in full lines in Fig. 32, when it will be out of the path of the hammer and be ready to be again turned over to receive and hold the hammer, as before.

Between the two I-beams 43 are set two cross-beams 120 and 121, (see Fig. 40,) and beneath the latter is a third cross-beam 122, under which are stays 123, secured to the I-beams 43. Bolted to the beam 120 is a yoke 124, in which are mounted the gears 125, 126, and 127, and the shaft 128' of the gear 125 carries a hand-wheel 128 for giving motion to the said gearing. Moving in guides 129 in the upper part of the yoke is a detent 130, which is connected with a hand-lever 131, which will force the detent into the teeth of the gear 125, and thus lock it fast. The lower wheel 127 is mounted on a shaft 132, running in bearings attached to the beams 120 and 122 and carrying a pinion 133, which meshes with a curved rack 134, plan and side views of which are shown in Figs. 13 and 14 on a rather large scale, and the relative positions of this rack and pinion may be seen in Fig. 4. This rack is attached by riveting or bolting the flattened ends to the outside of the leads, so that by turning the hand-wheel 128 the leads may be made to swing laterally on the bolt 86 to give them any desired inclination.

At convenient distances I set "bucks," as indicated at 135, 136, and 137, to connect the leads. At the bottom the buck 135 carries a sheave or pulley 138, around which I may pass a rope 139, when the leads are folded back, to draw the hammer down to the position shown in dotted lines in Fig. 1, so that its weight will tend to raise the leads to a vertical position. The same line can be used to draw the hammer to the position indicated by full lines, where it remains during transit from place to place, and in either case the line is operated by the engine.

To brace the standards 80 laterally, I use rods 140, whose lower ends are riveted or bolted to the beam 122 and their upper ends to the standards 80, as shown in Fig. 4. Just above these rods I set shorter rods 141, whose upper ends extend outward and are riveted to plates 142, whose inner ends are bolted to the top of said standards and form a support for the outer end of running-boards 143. Below this and resting on the beam 122 are other running-boards 144.

Mounted on the I-beams 43 are two frames 150 and 151, which are secured thereto by angle-irons and which form struts for the truss-rods 152, secured at their opposite ends to the I-beams 43. These frames are shown clearly in Figs. 18 and 31. The uprights are formed of ordinary rails 335, and those of the frame 150 are connected by similar rails 154 and 155, the latter being surmounted by a wooden bar 156, secured to it by clips 157 and forming a rest for the leads when turned down for transit. On each side of this frame are secured by clips 158 round iron brackets 159, which form supports for the running-boards 143. The other frame 151 is of similar form, but lower, and also carries brackets attached in the same way for the running-boards. It also supports brackets 160 for a shaft 161, on which loosely revolve sheaves 162 for the hammer and hoisting-ropes, beneath which is mounted a roller 162' to keep the ropes in place. These brackets are braced by stays 163, running back to rails 164, which connect the two frames. A cross-bar is shown at 164', having notches 165, in which the rods 34 and 67 slide. In line with this frame and rising from a transverse I-beam 166, which runs from one of the I-beams 43 to the other, is a bracket 167, which forms a bearing for the end of the shaft 60, that carries the hand-wheel, while its other end is supported by a similar bracket 168, rising from another transverse I-beam 169.

Between the upper and lower running-boards I provide an iron ladder 170, formed of two bars of iron 171, connected by rods running through gas-pipe rungs, the lower ends of said bars being bolted to the transverse I-beams 120, while the upper ends are fastened by clips to a short transverse plank 172, connecting the two running-boards 143. In front of this plank 172 is a flexible ladder made of copper-wire cables 173, having suitable rungs 174 fastened to them by clips 175. The lower end of this ladder is fastened to a narrow wooden plank 176, transversely attached to the running-board 143, and its upper end is connected to the top of the leads.

To prevent any motion of the carriage on the rails, I provide it with four grips 177, (shown best in Figs. 28 and 29,) consisting of two jaws 178, pivoted in the fork 179 of the screw 180, the shank of which passes through the plates 11 and also through square plates 181, set thereon. These screws are provided with lever-nuts 182, by turning which the lower ends of the jaws 178 are drawn tight against the under side of the treads of the rails 2, and the carriage is made immovable on the rails.

To keep the car firm and steady while the pile-driver is in operation, I drive wooden blocks 179' between the car-bolster and upper spring-timbers, which blocks I hang by chains 180', so that they can be removed for traveling, and yet be always ready for use at a moment's notice.

At convenient intervals on the leads are secured heavy side plates 181', on which cross-bars may be placed to support the hammer or hold the piling in position. On the lower one is set a stirrup 182' to form a support for the hammer when the leads are being raised, which stirrup would of course be removed before operating on the pile.

On each end of the carriage is a pair of sheaves 183, (see Figs. 9 and 10,) set on diagonally opposite corners between brackets 184, riveted on the cross-sills, and depending from the brackets under each sheave is a guard 185. A rope may be passed through the cabin-floor from a winch-head on the engine and around either of these sheaves, according to the position of the engine, and around a sheave 185' on the end of the car, so as to pull a pile in line with the pile-driver. This can be done whether the pile is at one side of the track or straight ahead, as the sheave 186 will allow the rope to work at an angle to the track. By having these sheaves at diagonally opposite corners the rope may be used in this manner at either end of the car according to the position of the machinery, and much hand labor will be saved, as well as time in handling the piles.

At each side of the pinion 134 (see Fig. 4) is shown a wrought-iron bracket 186, (see Figs. 13 and 46,) riveted to the cross I-beam 122, which is shaped with a recess 186' to receive and support the rack-buck 134 and prevent its springing out of gear with the pinion. The bracket is made long enough to extend downward sufficiently to be struck by the buck 136, thus preventing any shock to the rack-buck, which in time would damage it by the shock due to the leads coming to a perpendicular position. This bracket is strengthened by a stay 187, that is riveted to the lower side of the bracket and the under side of the I-beam.

At each side of the knuckle or joint of the guy is a plate 188, and running from one to the other of these plates is a bolt 189, around which is a sleeve 190, that acts as a strut to keep the ends of the braces rigidly in their proper positions.

It will be noticed that the racks 51 do not form a complete circle, but are only segments, the circle being cut away at the sides, so as not to interfere on lines of road when in transit. The pinions 52 are so arranged that when it is desired for the machine to make a complete circle one or the other of the pinions shall always be in gear, for before one of them runs out of gear with one rack-segment the other one is in gear with the opposite segment.

In order that the guy shall form no impediment to the leads being turned on the pivot 86, I make a peculiar connection between the lower section of the guy and the standards 97, which will be shown by Figs. 43 and 44, Sheet 2, in which 200 indicates a cross-bar riveted to the tops of the standards, and connected to this cross-bar by a bolt 201 is another cross-bar 202, having turned ends on which eyes 203 on the bottom of the lower section of the guy are slipped and secured there by a cotter 204 or other suitable means. At each end of this cross-bar 202 is secured plates 205, each having a line of holes 206, made on a curve of which the bolt 201 is the center. In the crossbar 200 there is a single hole at each end through which and through one of the holes 206 a pin 207 is passed, whereby the guys may be adjusted to any desired position in which the leads may be set, and thus hold the leads firmly at any angle. Each of the cross-bars has a plate 208 riveted to it, which not only keeps them at proper distance apart, but also forms a reinforcing means to supply the strength lost by boring the hole for the bolt.

When the leads are erect and it is desired to lower them, the pin 94 is withdrawn from the ring 92, and then as the brace 93 is free to move through said ring the weight of the guy and brace will cause the former to sag, and thus the leads will be drawn slightly out of the erect position until the weight of the monkey counterbalances the weight of the guy and brace. The leads are now drawn down by the hand-line 209, and as they fall the guy doubles up and the strut 190 coming in contact with the ropes 103 and 104 doubles them up also, as shown in Fig. 1. From this it will be seen that the strut not only serves the purpose of stiffening the guy, but also has the function of doubling up the ropes, and thus keeps them from dangling loose and getting in the way.

From the above description and accompanying drawings it will be seen that I have produced a pile-driver of great strength that can be moved to any desired position on a line of railway, rapidly set in position for work over a great range of ground, the leads raised to a vertical position very quickly, adjusted at any desired angle at will, and that they may be rapidly folded down for transportation or to get out of the way of passing trains.

I do not limit myself to the exact construction shown, as it is evident it may be varied in many ways without departure from the spirit of my invention; nor do I limit myself to its use on a car, as the carriage and pile-driving mechanism may be usefully employed when set on a scow or other vessel for setting piles for docks or for foundations for bridges, buildings, &c.

For convenience in drawing the following claims I shall hereinafter refer to the parts above the carriage in Fig. 1 as the "pile-driving mechanism."

What I claim as new is—

1. The combination with a pile-driving mechanism, of a turn-table, a carriage on which it is mounted and turns, a shaft passing through the turn-table and the carriage, a pinion on said shaft, a car on which the carriage travels longitudinally, and a rack on said car in which the pinion meshes, substantially as described.

2. The combination with a pile-driving mechanism, of a turn-table, a carriage on which it is mounted and turns, a shaft passing through the turn-table and the carriage, mechanism for turning said shaft carried on the turn-table, a pinion on said shaft, a car on which the carriage travels longitudinally and a rack on said car in which the pinion meshes, substantially as described.

3. The combination in a pile-driver, of a carriage, segmental racks mounted thereon, with a turn-table mounted on said carriage, vertical shafts carried by said turn-table, pinions on the lower ends of said shafts and bevel-pinions on their upper ends, a horizontal shaft, a worm-wheel thereon, bevel-pinions on said horizontal shaft, engaging with said first-mentioned bevel-pinions, a shaft carrying a worm for operating said worm-wheel and mechanism for giving it motion, substantially as described.

4. The combination in a pile-driver, of a carriage, segmental racks mounted thereon, with a turn-table mounted on said carriage, vertical shafts carried by said turn-table, pinions on the lower ends of said shafts and bevel-pinions on their upper ends, a horizontal shaft, a worm-wheel thereon, bevel-pinions on said horizontal shaft engaging with the first-mentioned bevel-pinions, a shaft carrying a worm for operating said worm-wheel, a bevel-wheel on said shaft, two pinions loose on a revolving shaft and engaging with said bevel gear-wheel, a clutch engaging with either of said loose pinions, and means for moving said clutch, substantially as described.

5. The combination in a pile-driver of a car, a longitudinal rack and rails mounted thereon, and a pinion gearing with the rack, with a carriage running on the rails on the car, a shaft mounted on said carriage having said pinion on its lower end and a bevel-gear at its upper one, a revolving horizontal shaft above said gear, bevel-pinions mounted loosely on said shaft, a clutch also on said shaft adapted to engage either of said pinions at will, and mechanism, substantially as described, for moving said clutch, as set forth.

6. The combination in a pile-driver of a car, a longitudinal rack and rails, and a pinion meshing in said racks, with a carriage mounted on said rails, having curved racks, a circular way, and a fixed block, a second block turning on said fixed block, and carrying the pile-driving mechanism proper, a shaft running through both blocks and carrying at its lower end the aforesaid pinion, a pinion meshing with the curved rack and mechanism for giving motion to the pinions, whereby motion is imparted to the carriage longitudinally and the pile-driving mechanism turned on the carriage, substantially as described.

7. The combination in a pile-driver of a car, a longitudinal rack and rails mounted thereon and a pinion geared with the rack, with a carriage mounted on the rails, a fixed block carried by said carriage, a second block turning on said fixed block, and carrying the pile-driving mechanism proper, a shaft running through both of said blocks acting as a king-bolt therefor and carrying at its lower end the pinion gearing with the longitudinal rack, and means substantially as described for giving said shaft motion, as set forth.

8. The combination in a pile-driver of a car, a longitudinal rack and rails mounted thereon and a pinion geared with the rack, with a carriage mounted on the rails, a fixed block carried by the carriage, a second block turning thereon, and carrying the pile-driving mechanism proper, a shaft running through both of said blocks carrying said pinion at its lower end, and means substantially as described for giving motion to said shaft and pinion and for turning the upper block and mechanism carried thereby, as set forth.

9. In a pile-driver, the combination of a carriage comprising longitudinal sills 11, cross-sills 12, a central fixed block 19, a plate 16 beneath said fixed block and bolted thereto, and rods 17 each having one end connected to said plate and their other ends to the sills 11, with a second block turning in said fixed block and a turn-table carried by said turning block, substantially as described.

10. The combination with a pair of leads, of a U-shaped buck 134 having forwardly-extending arms to attach to the leads, a shaft at right angles to the face of the leads, a pinion on said shaft, gearing for operating said shaft and pinion and the sliding lock 130 engaging with the teeth of said gearing, substantially as described.

11. The combination in a pile-driver, of a pair of leads, and a folding guy for the same having one end pivotally connected to the leads, and the other pivoted to some fixed part of the pile-driver with a brace for holding said guy rigidly, a pivoted ring receiving said brace, and a fastening device to hold the same, substantially as described.

12. The combination in a pile-driver, of a pair of leads, and a guy comprising two sections having one end of each pivotally connected to an end of the other, an end of one pivotally connected to the leads and an end of the other pivotally connected with some fixed portion of the pile-driver, with a brace running from near the pivoted center of the guy to the leads, a ring pivotally connected to the leads to receive said brace and a fastening device in said ring for holding the brace in position in the ring, substantially as described.

13. The combination in a pile-driver, of a pair of leads, a guy comprising two sections having one end of each pivotally connected to an end of the other, an end of one pivotally connected to the leads and an end of the other pivotally connected to some fixed portion of the pile-driver, a brace running from the near pivoted center of the guy to the leads, a ring through which the brace slides and a fastening device, substantially as described.

14. The combination in a pile-driver, of a pair of leads with a folding guy comprising two pairs of bars, each pair connected to the other and having a strut connected to both pairs, near their junction, one of said pairs being pivotally connected to the leads and the other similarly connected to some fixed part of the pile-driver, substantially as described.

15. The combination in a pile-driver, of a pair of leads, with a folding guy comprising two pairs of bars, each pair having crossed stays between them and each pair pivotally connected to the other, one pair being pivotally connected to the leads and the other similarly connected to some fixed part of the pile-driver, substantially as described.

16. The combination with the leads of a pile-driver, of a pair of sheaves and ropes therefor mounted at the top of the leads, and a third sheave adapted to move laterally with one of the ropes, substantially as described.

17. The combination with the leads of a pile-driver, of the sheaves 102, the bearing 101 therefor, the shaft 106 suitably supported in front of the sheaves 102, the sheave 10, and the guard therefor, adapted to move laterally, substantially as described.

18. The combination in a pile-driver, of the hammer, leads for the same, a tripping-block arranged to swing over in the path of the hammer and a rope connected to the tripping-block and adapted to operate the same in each direction, substantially as described.

19. In a pile-driver, the combination with a carriage, of a pair of longitudinal beams carried thereby, standards rising from said beams, leads pivoted in said standards, a transverse beam running under the longitudinal beams and braces running from the ends of the transverse beam to the standard, substantially as described.

20. The combination in a pile-driver and with the leads thereof, of a running-board supported on the frame, and a flexible ladder connected to the running-board and to the leads, so as to fold with the latter, substantially as described.

21. In a pile-driver, the combination of a pair of pivoted leads, a rack connected thereto, a pinion gearing with said rack and a support for the rack attached to some fixed part of the machine, substantially as described.

22. In a pile-driver, the combination of a pair of leads, a buck connected to both leads, a rack on said buck, a pinion gearing with said rack, a support for the rack and means for stopping the leads as they assume the vertical position, substantially as described.

23. The combination of a movably-mounted carriage, a turn-table, two bearing-sections respectively attached to the carriage and turn-table, by which bearing-sections the turn-table is mounted to turn on the carriage, a shaft passing axially through the bearing-sections, a rack, a gear attached to the shaft and meshed with the rack, and means mounted on the turn-table for driving the shaft, substantially as described.

24. The combination with a railway-car or like vehicle, of a carriage mounted to slide thereon, a turn-table mounted to turn on the carriage, and a gear for moving the carriage on the car, such gear comprising an element passing through an axis coincident with the axis of movement of the turn-table; substantially as described.

25. The combination with a support, of a rack mounted stationarily thereon, a carriage mounted to move on the support, a turn-table mounted to turn on the carriage, a shaft mounted in the turn-table and carriage coincident with the axis of movement of the turn-table, a gear attached to the shaft and engaging said rack, and means on the turn-table for driving the shaft, substantially as described.

26. The combination of a railway-car, a carriage mounted to turn thereon, a turn-table mounted to slide on the carriage, and gearing for advancing the carriage on the railway-car, such gearing comprising a shaft coincident with the axis of movement of the turn-table on the carriage, substantially as described.

27. The combination with a railway-car, of a carriage mounted to move thereon, a rack attached stationarily to the car, a turn-table mounted to turn on the carriage, a shaft mounted in the turn-table and coincident with the axis of movement of the turn-table on the carriage, a gear attached to said shaft and meshing with said rack to move the carriage on the car, and means on the turn-table for driving said shaft, substantially as described.

28. The combination of a railway-car, a carriage mounted thereon, a pivot-bearing section attached rigidly thereto, a turn-table, a pivot-bearing section attached to said turn-table, the pivot-bearing sections engaging each other to mount the turn-table to turn on the carriage, a shaft passing axially through the pivot-bearings, means driven by the shaft for advancing the carriage, and means for driving the shaft, substantially as described.

29. In a railway-car, longitudinal rails thereon, a carriage having wheels moving on said rails, and means for locking said carriage to said rails, substantially as described.

30. In a railway-car, longitudinal rails thereon, a body moving on said rails, and means for locking said body to said rails comprising jaws projecting from said body arranged to grasp and hold to the rails, substantially as described.

31. In a railway-car, longitudinal rails thereon, a body moving on said rails, jaws projecting from said body and arranged to grasp said rails, and means coacting with said jaws and causing them to grasp said rails and hold said body from movement, substantially as described.

In testimony whereof I affix my signature, in the presence of two witnesses, this 8th day of July, 1899.

SAMUEL H. BLOWERS.

Witnesses:
A. A. FRAZIER,
GEO. L. FOLEY.